United States Patent
Yuzawa

(10) Patent No.: US 6,951,115 B2
(45) Date of Patent: Oct. 4, 2005

(54) REFRIGERANT COMPOSITION AND REFRIGERATING CIRCUIT USING THE SAME

(75) Inventor: Jiro Yuzawa, Ora-Gun (JP)

(73) Assignees: Sanyo Electric Co., Ltd., Osaka (JP); Sanyo Electric Biomedical Co., Ltd., Osaka (JP)

(*) Notice: Subject to any disclaimer, the term of this patent is extended or adjusted under 35 U.S.C. 154(b) by 0 days.

(21) Appl. No.: 10/659,753

(22) Filed: Sep. 10, 2003

(65) Prior Publication Data

US 2004/0107708 A1 Jun. 10, 2004

(30) Foreign Application Priority Data

Sep. 27, 2002 (JP) .................................... 2002-283234

(51) Int. Cl.$^7$ ............................. F25B 1/00; C09K 5/00
(52) U.S. Cl. ............................. 62/114; 62/498; 62/502; 252/67
(58) Field of Search .................. 62/114, 467, 498, 62/502; 252/67, 68, 70, 69

(56) References Cited

U.S. PATENT DOCUMENTS

| | | | |
|---|---|---|---|
| 3,768,273 A | * | 10/1973 | Missimer ........................ 62/84 |
| 5,866,029 A | * | 2/1999 | Lund et al. ..................... 252/67 |
| 6,235,215 B1 | * | 5/2001 | Seino et al. .................... 252/68 |
| 6,502,410 B2 | * | 1/2003 | Podtchereniaev et al. ...... 62/114 |
| 6,640,841 B2 | * | 11/2003 | Thomas et al. ................ 141/1 |
| 6,652,769 B1 | * | 11/2003 | Yuzawa ......................... 252/67 |

FOREIGN PATENT DOCUMENTS

| | | | | |
|---|---|---|---|---|
| EP | 1 136 540 A1 | * | 9/2001 | ............ C09K/5/04 |
| WO | WO 02/26913 A3 | | 4/2002 | |
| WO | WO 02/26913 A2 | * | 4/2002 | ............ C09K/5/04 |

* cited by examiner

Primary Examiner—Cheryl J. Tyler
Assistant Examiner—Richard L. Leung
(74) Attorney, Agent, or Firm—Darby & Darby

(57) ABSTRACT

The development of an alternate refrigerant composition which is free from a possibility of causing depletion of the ozone layer and capable of maintaining the performance of a conventional refrigerating circuit without modifying the circuit is desired. An object of the present invention is to provide such a refrigerant composition and a refrigerating circuit using the refrigerant composition. A refrigerant composition of the present invention comprises R245fa ($CF_3CH_2CHF_2$), R125 ($CHF_2CF_3$), R508A (R23/R116:39/61) and R14 (tetrafluoromethane: $CF_4$). Thus, the refrigerant composition has no possibility of causing depletion of the ozone layer. Further, since the composition is noncombustible, possible combustion can be prevented even if it leaks.

5 Claims, 3 Drawing Sheets

| REFRIGERANT COMPOSITION | AMOUNT USED |
|---|---|
| R245fa ($CF_3CH_2CHF_2$) | 17.4 to 50 wt% |
| R125 ($CHF_2CF_3$) | 12 to 25 wt% |
| R508A (R23/R116:39/61) | 13.2 to 36.4 wt% |
| R14 ($CF_4$) | 13.2 to 36.4 wt% |
| n-PENTANE | 0.1 to 12 wt% |

FIG. 2

| | EXAMINED SPECIFICATION |
|---|---|
| REFRIGERANTS | R245fa: 37.4 wt% |
| | R125: 21.6 wt% |
| | R508A: 19.8 wt% |
| | R14: 21.2 wt% |
| | n-PENTANE: 5.8 wt% |
| 2. PRESSURE PD | 1,638 kPa |
| 19. PRESSURE PS | 200 kPa |
| 1. COMP. UNDER CASE | 67.9°C |
| 2. PRESSURE DISCHARGE PIPE | 86.3°C |
| 19. SUCTION PIPE | 14.3°C |
| 8. INTERMEDIATE HX1 | -5.7°C |
| 13. INTERMEDIATE HX2 | -34.4°C |
| 15. INTERMEDIATE HX3 | -55.2°C |
| 17. INLET OF EVAPORATOR | -97.0°C |
| 18. OUTLET OF EVAPORATOR | -88.4°C |
| AIR IN THE MIDDLE OF REFRIGERATOR | -91.5°C |

NOTES:
THE NUMBERS ARE THE SAME AS THOSE ALLOCATED TO THE
CONSTITUENTS SHOWN IN FIG. 1.
THE "INLET OF EVAPORATOR" REFERS TO NOT EXACTLY THE INLET OF
THE EVAPORATOR 17 BUT A PORTION IMMEDIATELY AFTER THE CAPILLARY 16.
THE NUMBER FOR "AIR IN THE MIDDLE OF REFRIGERATOR" IS
OMITTED SINCE IT IS NOT SPECIFIED IN FIG. 1.

FIG. 3

| REFRIGERANT COMPOSITION | AMOUNT USED |
|---|---|
| R245fa ($CF_3CH_2CHF_2$) | 17.4 to 50 wt% |
| R125 ($CHF_2CF_3$) | 12 to 25 wt% |
| R508A (R23/R116:39/61) | 13.2 to 36.4 wt% |
| R14 ($CF_4$) | 13.2 to 36.4 wt% |
| n-PENTANE | 0.1 to 12 wt% |

REFRIGERANT COMPOSITION AND REFRIGERATING CIRCUIT USING THE SAME

BACKGROUND OF THE INVENTION

1. Field of the Invention

The present invention relates to a refrigerant composition which is suitable for an ultralow-temperature refrigerator using a non-azeotropic mixed refrigerant and is free of a possibility of causing depletion of the ozone layer.

2. Description of the Related Art

Heretofore, a refrigerator using a non-azeotropic mixed refrigerant achieves ultralow temperatures by condensing refrigerants having lower boiling points in succession by evaporation of refrigerants having higher boiling points and a low-temperature refrigerant returning from the last evaporator so as to evaporate a refrigerant having the lowest boiling point at the end.

The present inventor has proposed examples of such a refrigerator and a refrigerant composition in Japanese Patent Publication No. 55944/1994.

However, since the refrigerant uses HCFC, it may cause depletion of the ozone layer.

Accordingly, the development of an alternate refrigerant composition which is free from a possibility of causing depletion of the ozone layer and capable of maintaining the performance of a conventional refrigerating circuit without modifying the circuit is desired.

Under the circumstances, the present applicant has proposed a refrigerant composition comprising R600 (n-butane: $H_3CH_2CH_2CH_3$), R125 ($CHF_2CF_3$), R23 (trifluoromethane: $CHF_3$) and R14 (tetrafluoromethane: $CF_4$) in Japanese Patent Application No. 526882/2001. However, since this refrigerant composition uses R600 which is combustible, it may burn upon leakage. It is better to avoid use of a combustible material on as many occasions as possible.

The present invention provides a refrigerant composition which hardly burns upon leakage and is free from a possibility of causing depletion of the ozone layer, and a refrigerating circuit using the refrigerant composition.

SUMMARY OF THE INVENTION

A refrigerant composition of the present invention comprises R245fa ($CF_3CH_2CHF_2$), R125 ($CHF_2CF_3$), R23 (trifluoromethane: $CHF_3$) and R14 (tetrafluoromethane: $CF_4$)

Further, a refrigerant composition of the present invention comprises R245fa ($CF_3CH_2CHF_2$), R125 ($CHF_2CF_3$), R508A (R23/R116:39/61) or R508B (R23/R116:46/54) and R14 (tetrafluoromethane: $CF_4$).

Further, the refrigerant composition of the present invention is prepared by mixing 17.4 to 50 wt % of R245fa ($CF_3CH_2CHF_2$), 12 to 25 wt % of R125, 13.2 to 36.4 wt % of R508A (R23/R116:39/61) or R508B, and 13.2 to 36.4 wt % of R14.

Further, the refrigerant composition of the present invention further comprises 0.1 to 12 wt % of n-pentane.

In addition, a refrigerating circuit of the present invention is a single ultralow-temperature system which substantially comprises a condenser, an evaporator, a compressor, and heat exchangers and gas-liquid separators disposed in a multi-stage manner, wherein any of the above non-azeotropic mixed refrigerant compositions is used.

BRIEF DESCRIPTION OF THE DRAWINGS

FIG. 2 is a diagram for illustrating the performance of this embodiment.

FIG. 3 is a diagram for illustrating the proportions of constituents used in this refrigerant composition.

DETAILED DESCRIPTION OF THE PREFERRED EMBODIMENT

Figure 1:
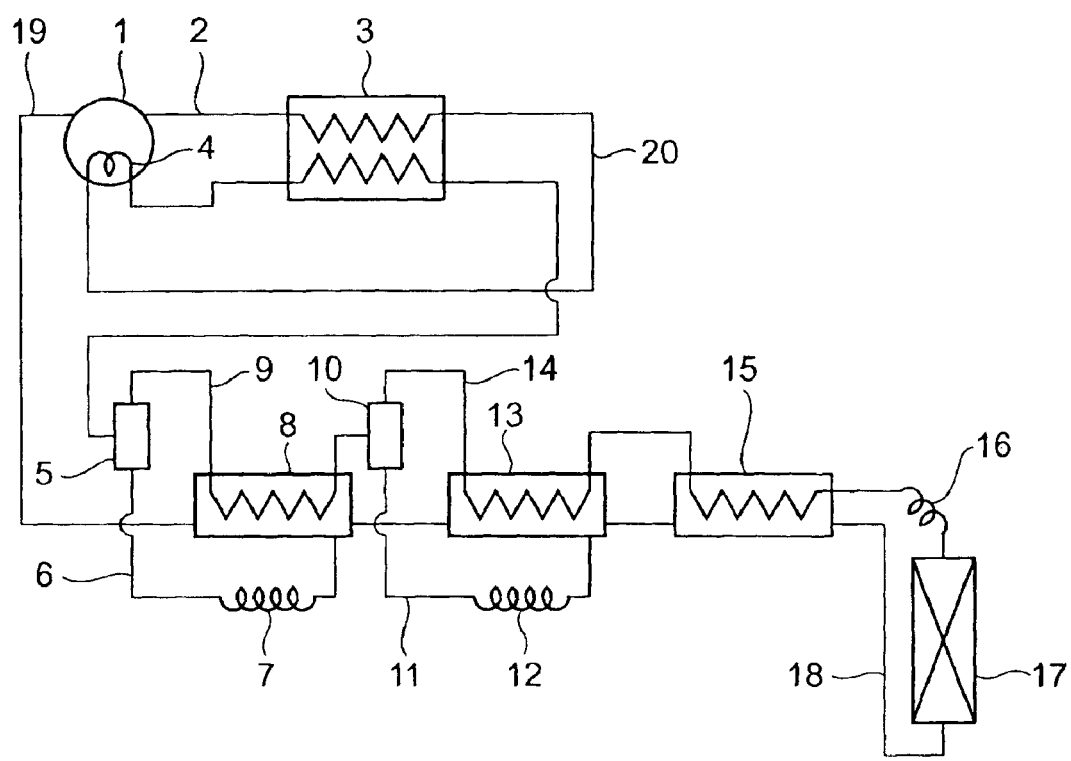
FIG. 1 is a diagram for illustrating a refrigerant circuit of the present invention.

A first embodiment of the present invention will be described with reference to FIG. 1.

FIG. 1 shows a refrigerant circuit using a non-azeotropic mixed refrigerant comprising R245fa, R125, R508A and R14.

A pipe (2) on the outlet side of a compressor (1) passes through a condenser (3) and a frame pipe (20) and is connected to an oil cooler (4) of the compressor (1).

Coming out of the oil cooler (4), the pipe passes through the condenser (3) again and is connected to a first gas-liquid separator (5).

A liquid phase pipe (6) which comes out of the first gas-liquid separator (5) is connected to a first capillary tube (7).

The first capillary tube (7) is connected to a first intermediate heat exchanger (8).

A gas phase pipe (9) which comes out of the first gas-liquid separator (5) passes through the first intermediate heat exchanger (8) and is connected to a second gas-liquid separator (10).

A liquid phase pipe (11) which comes out of the second gas-liquid separator (10) is connected to a second capillary tube (12) which is connected to a second intermediate heat exchanger (13).

A gas phase pipe (14) which comes out of the second gas-liquid separator (10) passes through the second intermediate heat exchanger (13) and a third intermediate heat exchanger (15) in succession and is then connected to a third capillary tube (16).

The third capillary tube (16) is connected to an evaporator (17).

A pipe (18) which comes out of the evaporator (17) is connected to the third intermediate heat exchanger (15) which is connected to the second intermediate heat exchanger (13). Then, the second intermediate heat exchanger (13) is connected to the first intermediate heat exchanger (8) which is then connected to a pipe (19) on the inlet side of the compressor (1).

This refrigerant circuit is filled with a non-azeotropic mixed refrigerant comprising R245fa, R125, R508A and R14. It is considered possible to use 508B in place of 508A.

As for the boiling points of the refrigerants at atmospheric pressure, the boiling point of R245fa is 14.9° C., that of R125 is −48.57° C., that of R508A is −85.7° C., and R14 is −127.85° C.

Further, as shown in FIG. 2, the proportions of the refrigerants used in the present embodiment are such that without n-pentane, R245fa is 37.4 wt %, R125 is 21.6 wt %, R508A is 19.8 wt %, and R14 is 21.2 wt %. A further addition of 5.8 wt % of n-pentane completes preparation of a refrigerant composition to be used.

Next, the operation of the refrigerant circuit will be described.

A high temperature/high pressure gaseous mixed refrigerant discharged from the compressor (1) flows into the condenser (3), radiates heat in the condenser (3), cools a lubricant oil of the oil of the compressor (1) in the oil cooler (4), and radiates heat in the condenser (3) again. R245fa and a large portion of R125 in the mixed refrigerant are liquefied and flow into the first gas-liquid separator (5).

Then, liquid R245fa and R125 flow into the liquid phase pipe (6), while a gaseous portion of R125, R508A and R14 flow into the gas phase pipe (9).

R245fa and R125 which have flown into the liquid phase pipe (6) are depressurized in the first capillary tube (7) and flow into the first intermediate heat exchanger (8) so as to evaporate therein.

The temperature of the first intermediate heat exchanger (8) is around −5.7° C. since a refrigerant returning from the evaporator (17) flows thereinto.

Meanwhile, of R125, R508A and R14 which have flown into the gas phase pipe (9), R125 and a portion of R508A are cooled by R245fa and R125 which evaporate in the first intermediate heat exchanger (8) and the refrigerant returning from the evaporator (17) so as to be condensed and liquefied while passing through the first intermediate heat exchanger (8) and then flow into the second gas-liquid separator (10).

Then, liquid R125 and R508A flow into the liquid phase pipe (11), while a gaseous portion of R508A and R14 flow into the gas phase pipe (14).

R125 and R508A which have flown into the liquid phase pipe (11) are depressurized in the second capillary tube (12) and flow into the second intermediate heat exchanger (13) so as to evaporate therein. The temperature of the second intermediate heat exchanger (13) is around −34.4° C. since a refrigerant returning from the evaporator (17) flows thereinto.

Meanwhile, of R508A and R14 which have flown into the gas phase pipe (14), R508A is cooled by R125 and R14 which evaporate in the second intermediate heat exchanger (13) and the refrigerant returning from the evaporator (17) so as to be condensed and liquefied while passing through the second intermediate heat exchanger (13) and then passes through the third gas-liquid separator (15).

The temperature of the third intermediate heat exchanger (15) is around −55.2° C. since a refrigerant coming right out of the evaporator (17) flows thereinto.

Hence, R14 which flows through the gas phase pipe (14) is condensed in the third intermediate heat exchanger (15). These liquefied R508A and R14 are depressurized in the third capillary tube (16) and flow into the evaporator (17) so as to evaporate therein, thereby cooling surroundings thereof.

At this time, the temperature of the evaporator (17) became an ultralow temperature of about −92.7° C. on average. By using the evaporator (17) for, e.g., cooling the inside of a freezer, the inside of the freezer could be cooled to about −91.5° C.

A refrigerant which has come out of the evaporator (17) flows through the intermediate heat exchangers (15), (13) and (8) in turn, merges with refrigerants evaporating in the exchangers, and then returns to the compressor (1) through the suction pipe (19).

The oil of the compressor (1) which circulates in the refrigerant circuit is returned to the compressor (1) in the state of being dissolved in R245fa.

Further, R245fa also serves to lower the discharge temperature of the compressor (1).

The performance of this refrigerating circuit is shown in FIG. 2.

The proportions of these refrigerants are not limited to those in the present embodiment. That is, it was confirmed by an experiment that an ultralow temperature of not higher than −90° C. could be obtained in the evaporator (17) by mixing 17.4 to 50 wt % of R245fa, 12 to 25 wt % of R125, 13.2 to 36.4 wt % of R508A or R508B, and 13.2 to 36.4 wt % of R14 (refer to FIG. 3).

Further, it was also confirmed that addition of 0.1 to 12 wt % of n-pentane to this refrigerant further improved recovery of oil.

In addition, similar ultralow temperatures can be obtained even if R23 (trifluoromethane, $CHF_3$, boiling point: −82.1° C.) resulting from removing R116 from R508A is used in the above mixed refrigerant.

According to the present invention, the refrigerant has no possibility of causing depletion of the ozone layer, and since the refrigerant composition is noncombustible, possible combustion can be prevented even when it leaks.

What is claimed is:

1. A refrigerant composition comprising R245fa ($CF_3CH_2CHF_2$), R125 ($CHF_2CF_3$), one of either R508A (R23/R116:39/61) or R508B (R23/R116:46/54) and R14 (tetrafluoromethane: $CF_4$) wherein the wt % of each of R125, one of either R508A or R508B and R14 is within the range of from 19.8 wt % to 21.8 wt % of the composition.

2. The composition of claim 1 further comprising 0.1 to 12 wt % of n-pentane.

3. The refrigerant composition of claim 1 wherein

R125=21.6 wt %;

R508A or R508B=19.8 wt % and

R14=21.2 wt %.

4. The composition of claim 3 further comprising 0.1 to 12 wt % of n-pentane.

5. A refrigerant circuit which is a single ultralow-temperature system comprising a condenser, an evaporator, a compressor, and heat exchangers including second and third intermediate heat exchangers and gas-liquid separators disposed in a multi-stage manner, wherein the non-azeotropic mixed refrigerant composition of any one of claims 1, 2, 4, and 3 is used and the R125, R508A or R508B and R14 are condensed and evaporate in the second intermediate exchanger, the third intermediate heat exchanger and the evaporator.

* * * * *